Patented Oct. 21, 1941

2,260,143

UNITED STATES PATENT OFFICE 2,260,143

METHOD OF MAKING POLISHED RUBBER ARTICLES

Walter H. Juve, Akron, Ohio, assignor to The Monarch Rubber Company, Hartville, Ohio, a corporation of Ohio No Drawing. Application February 28, 1938, Serial No. 192,967

3 Claims. (Cl. 91—68)

The invention relates to the manufacture of relatively soft or semi-hard pliable molded rubber parts made from rubber compounds, and more particularly to the provision of a glossy, smooth, shiny or slippery and relatively impervious surface therefor.

Mechanical rubber goods parts are used extensively in the construction of automobiles. Many of such parts, such as grommets, gaskets, beading, channels and the like, are visible from the exterior of an automobile. The nature of the surface of such exposed parts accordingly affects the appearance of an automobile.

Such rubber parts, which by their very nature must be relatively soft or semi-hard but pliable, as made by prior practice will "check" upon extended exposure to sunlight. Moreover, gasoline or oil, or other foreign substances used or encountered incident to the operation of an automobile may be absorbed by such rubber parts, causing the same to swell and then crack. Such checking and cracking destroys the neat and trim exterior appearance of such rubber parts, and therefore of an automobile visibly provided with the same.

It has for some years been attempted to overcome these difficulties by applying a coating of lacquer to such exposed rubber parts, but this treatment only delays, but does not solve the problem, because the lacquer will check and peel off, resulting in an untidy and undesirable appearance.

It is therefore a general object of the present invention to provide for the manufacture of relatively soft or semi-hard pliable rubber parts for use in the construction of automobiles where such parts are exposed (except tires), the surface of which rubber parts may be provided with a lustrous, glossy, smooth, slippery or shiny appearance, which resists the absorption of gasoline, oil, or other ordinary rubber solvents, and which resists the action of the elements, oxidation and sun checking.

I have discovered that if rubber parts molded from rubber compounds are treated with a halogen, a reaction occurs between the halogen and the surface of the rubber compounds which hardens the surface and gives it a resinous-like or waxy appearance so that the same will take and retain a polish. Such halogenation removes the characteristic "drag" ordinarily present on rubber articles and provides upon polishing a slippery, glossy, smooth, shiny or lustrous surface.

Accordingly, it is a further object of the present invention to subject a relatively soft or semi-hard pliable rubber article molded from a rubber compound to the action of a free halogen and to then polish the same in order to provide a lustrous surface therefor which resists the action of the elements, oxidation, sun checking and the absorption of gasoline, oil and the like.

These and other objects may be obtained by the methods, steps, treatments and the like, which are hereinafter set forth in detail and claimed and which may be set forth in general terms as preferably including molding a relatively soft or semi-hard, resilient or pliable rubber part from a rubber compound, preferably cleaning the same, subjecting the part to the action of a halogen such as chlorine for a period of time, stopping the halogenating action if necessary, rinsing in alcohol, and then polishing the part.

It is to be understood that the present improvements are not limited to the treatment of parts for use only in the construction of automobiles; as it is clear that the method may be used in the manufacture of other rubber parts which must be pliable or resilient and on which a polished surface is desired, as for instance, bulbs for atomizers.

The halogenation step of the process may be carried out by treatment with bromine, or fluorine, but chlorine is preferred because it is less expensive to use the same. A detailed example of a manner in which the process may be carried out using chlorine as the halogenating agent is as follows:

The rubber parts to be treated are first molded from a suitable rubber compound. If the rubber articles become dirty or greasy after molding they should be cleaned and this may be accomplished by tumbling the molded rubber parts for from say three (3) to five (5) minutes in a three per cent (3%) solution of hydrochloric acid, after which the parts are rinsed in water. This cleaning step may, however, be omitted if the parts are not dirty or greasy; or the cleaning step may be carried out by using other cleaning agents such as caustic soda solutions or organic solvents such as naphtha or alcohol.

The halogenation step is then carried out and the same may be accomplished by providing a one per cent (1%) hydrochloric acid solution and a one and one-half per cent (1½%) solution of calcium or sodium hypochlorite and mixing equal quantities of said hydrochloric acid and said calcium or sodium hypochlorite solutions just prior to use.

The parts to be halogenated are tumbled for from say three (3) to five (5) minutes in said solution. The effect of this solution is to release free chlorine, which reacts upon the surface of the rubber compound to harden the same and make it resinous-like or waxy.

The halogenation step can of course be carried out by providing other solutions which will release free chlorine, or a free halogen, or may be carried out in a chamber into which chlorine gas is introduced. The parts preferably are then rinsed in water.

Depending upon the nature of the rubber compounds, in some cases it may be desirable or necessary to stop a continuing reaction set up by the halogenation step and this may be accomplished by then washing the parts in a five per cent (5%) sodium thiosulfite solution for a period of say five (5) minutes, after which the parts are rinsed in water. It is to be understood that the sodium thiosulfite wash is not necessary in all cases, but only when it is desired to or necessary to stop a continuing effect of the halogenation step.

After the rinse which follows either the halogenation step or the sodium thiosulfite wash, the parts are dried and then rinsed in alcohol. The step of rinsing in alcohol is necessary, although the drying prior thereto is not necessary for the ultimate treatment, but merely for preventing dilution of and waste of alcohol used in the alcohol rinse.

After the alcohol rinse, the parts are dried and then tumbled in contact with rags or other polishing materials or agents or are otherwise polished so as to provide a slippery, glossy, smooth, shiny or lustrous polished surface on the parts.

It has been found that soft or semi-hard pliable or resilient rubber articles molded from a rubber compound when treated in accordance with the present invention, have a surface which will resist the action of the elements and sun checking and which will resist the absorption of gasoline, oil and the like. The parts thus retain the smooth, shiny or lustrous appearance originally provided so that when used in the construction of automobiles in visible places the same will never mar or detract from the appearance of the automobile equipped therewith.

Having now described the features of the invention, the details of the necessary or desirable steps of the same, and the advantages and results obtained by use of the invention; the new and useful methods, steps, treatments, and reasonable mechanical equivalents thereof obvious to those skilled in the art, are set forth in the appended claims.

I claim:

1. In a method of making a shiny, resilient rubber article, the steps of subjecting a molded rubber compound article for from three to five minutes to the action of a solution composed fifty per cent of a one and one-half per cent calcium hypochlorite solution and fifty per cent of a one per cent hydrochloric acid solution, rinsing the same in water, drying the same, rinsing the same in alcohol, and then polishing the same.

2. In a method of making a shiny, resilient rubber article, the steps of cleaning a molded rubber compound article for from three to five minutes in a three per cent hydrochloric acid solution, rinsing the same in water, subjecting the same for from three to five minutes to the action of a solution composed fifty per cent of a one and one-half per cent solution of calcium hypochlorite and fifty per cent of a one per cent solution of hydrochloric acid, rinsing the same in water, washing the same in a five per cent sodium thiosulfite solution for a period of up to five minutes, rinsing the same in water, drying the same, rinsing the same in alcohol, and then polishing the same.

3. In a method of making a pliable, resilient, rubber article having a shiny, lustrous surface, the steps of cleaning a molded rubber compound article, then subjecting the same for approximately five minutes to the action of a solution composed fifty per cent of a 1½% calcium hypochlorite solution and fifty per cent of a 1% hydrochloric acid solution, then rinsing the same in water, and then polishing the same.

WALTER H. JUVE.